United States Patent
Wolfe

(10) Patent No.: US 6,922,133 B2
(45) Date of Patent: Jul. 26, 2005

(54) METHOD AND APPARATUS FOR PROVIDING A PROOF OF DELIVERY VERIFICATION FOR FREIGHT TRANSPORTATION SYSTEMS

(75) Inventor: Chris Wolfe, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 414 days.

(21) Appl. No.: 09/798,481

(22) Filed: Mar. 2, 2001

(65) Prior Publication Data

US 2002/0123917 A1 Sep. 5, 2002

(51) Int. Cl.[7] .............................................. G05B 19/00
(52) U.S. Cl. ..................... 340/5.9; 340/988; 340/994; 701/208; 705/7
(58) Field of Search ........................ 340/5.9, 994, 988, 340/539, 542, 825.49; 701/208, 29, 201, 202; 705/7; 342/44

(56) References Cited

U.S. PATENT DOCUMENTS

| | | | |
|---|---|---|---|
| 99,567 A | | 2/1870 | Joao ................................ 705/1 |
| 5,910,896 A | * | 6/1999 | Hahn-Carlson ........ 364/479.01 |
| 6,057,779 A | * | 5/2000 | Bates ..................... 340/825.31 |
| 6,192,400 B1 | | 2/2001 | Hanson et al. ............... 709/217 |
| 6,486,801 B1 | * | 11/2002 | Jones .......................... 340/994 |
| 6,615,132 B1 | * | 9/2003 | Nagasaka et al. ........... 701/200 |

OTHER PUBLICATIONS

Magellan Pharmaceutics–Clinical Supply Operations, Copyright 2001 Magellan Laboratories (retrieved on Aug. 5, 2002). Retrieved from the Internet: www.magellanlabs.com/Services/brochures/Pharmaceutics.pdf.

Roadfreighters Taking it Further, Copyright 2002 Eastern Equities Corporation (received on Aug. 5, 2002). Retrieved from the Internet: www.Roadfreighters.co.nz/distribution-.asp.

* cited by examiner

*Primary Examiner*—Michael Horabik
*Assistant Examiner*—Matsuichiro Shimizu
(74) *Attorney, Agent, or Firm*—Philip R. Wadsworth; Charles D. Brown; Thomas M. Thibault

(57) ABSTRACT

A method and apparatus for providing a proof of delivery verification for freight transportation systems. A vehicle transmits an indication of arrival at a destination. A remote station receives the indication and validates the arrival of the vehicle. If the arrival is validated, a proof of delivery verification of a delivery associated with the arrival is provided to a shipper, carrier, or other interested party.

11 Claims, 3 Drawing Sheets

METHOD AND APPARATUS FOR PROVIDING A PROOF OF DELIVERY VERIFICATION FOR FREIGHT TRANSPORTATION SYSTEMS

BACKGROUND

I. Field of the Invention

The present invention relates generally to the freight transportation industry and more particularly to a method and apparatus for providing proof of delivery verification for use in such freight transportation systems.

II. Description of the Related Art

Throughout much of the world today, the primary transportation system used to move goods from one location to another is by tractor-trailer vehicles. Such vehicles provide trucking companies, or carriers as they are known, with the capability and flexibility to transport large amounts of goods to multiple destinations efficiently.

In a typical transaction, a carrier is called upon to transport goods from one location to another by a customer, otherwise known as a shipper. Examples of shippers might include almost any manufacturer of goods. The shipper provides delivery instructions to the carrier comprising details of the shipment, including, for example, when and where to pick up the goods and where to ship them. Generally, these instructions are provided to the carrier and the carrier dispatches a vehicle to transport the goods. The instructions pertaining to the shipment are provided to vehicle operator in the form of a document commonly referred to as a "bill of lading". The bill of lading may also provide other pertinent information concerning the shipment, such as a description and quantity of the goods being shipped.

The vehicle arrives at the shipper and is loaded with goods in accordance with the bill of lading. After the vehicle has been loaded, the vehicle operator may secure the goods by locking an access door, such as a roll-down door of a trailer. In addition, a seal may be installed proximate to the door to prove that the door was not opened during transit.

When the vehicle arrives at the intended destination, commonly known as a consignee, the trailer door is unlocked and the seal is broken, if these were used by the vehicle operator. The goods are then unloaded and received by the consignee. The consignee will generally sign the bill of lading signifying that the goods were received and also denoting the time and date of the delivery. The signed bill of lading is then generally given to the vehicle operator.

The vehicle operator then departs the consignee. However, instead of returning directly to the carrier, he or she may proceed to another pick-up destination. In many cases, the vehicle operator will be many hundreds of miles away from the carrier or a branch office associated with the carrier, making a direct return impractical. Thus, in many instances, the vehicle operator continues to make other pick-ups and deliveries of goods before returning to the dispatch center. It may take several days or even weeks before the vehicle operator returns to the dispatch center.

The carrier is generally paid for the delivery by submitting an invoice to the shipper after the delivery is made. The invoice typically includes a copy of the signed bill of lading. In most cases, the signed bill of lading is an extremely important document, as it evidences proof of delivery for the accompanying invoice. Many consignees will not pay such an invoice without a copy of the signed bill of lading or similar document evidencing delivery.

Unfortunately, the delay in obtaining signed bills of lading from vehicle operators introduces many problems for carriers. The bills of lading are sometimes lost or destroyed, or they may become unreadable. A complicated accounting process must be used to match invoices to their respective bills of lading. Most importantly, the delay in returning the bill of lading to the carrier by the vehicle operator means a delay of payment from the consignee.

What is needed is an efficient method and apparatus for quickly providing a proof of delivery verification to various parties involved in the transportation of goods to eliminate the just-mentioned problems. Ideally, the method and apparatus should be able to prove that the goods were not accessed during transit without the use of seals, which are generally easily compromised.

SUMMARY

The present invention is directed to a method and apparatus for providing a proof of delivery verification for freight transportation systems. In one embodiment, the proof of delivery verification comprises a method, the method comprising the steps of transmitting a validation request message upon the arrival of a vehicle at a destination, said validation request message comprising information pertaining to the arrival of the vehicle. The validation request is received by a remote station which verifies whether or not the arrival of the vehicle corresponds to a record of an expected shipment. If the arrival of the vehicle matches the expected shipment information, a proof of delivery verification is generated and provided to an interested party associated with the delivery.

In another embodiment, the present invention is directed to an apparatus, the apparatus comprising a remote station for receiving a message that a vehicle has arrived at a destination. A processor associated with the remote station validates the arrival against an expected delivery record stored in a database. If a record is found matching the information relating to the message, the arrival is validated and a proof of delivery verification is generated. The apparatus further comprises means for providing the proof of delivery verification to an interested party.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

The present invention is directed to a method and apparatus for providing a proof of delivery verification for freight transportation systems. Although the present invention is described within the context of the trucking industry using a satellite-based wireless communication system, it should be understood that the present invention may be used alternatively, or in conjunction with, other communication systems, such as in a terrestrial-based wireless communication systems, or a data communication network, such as the Internet. In addition, the present invention is not intended to be limited to the trucking industry, but could be used in any industry to provide a proof of delivery verification, including the railroad industry, the shipping industry, or the air freight industry.

Figure 1:
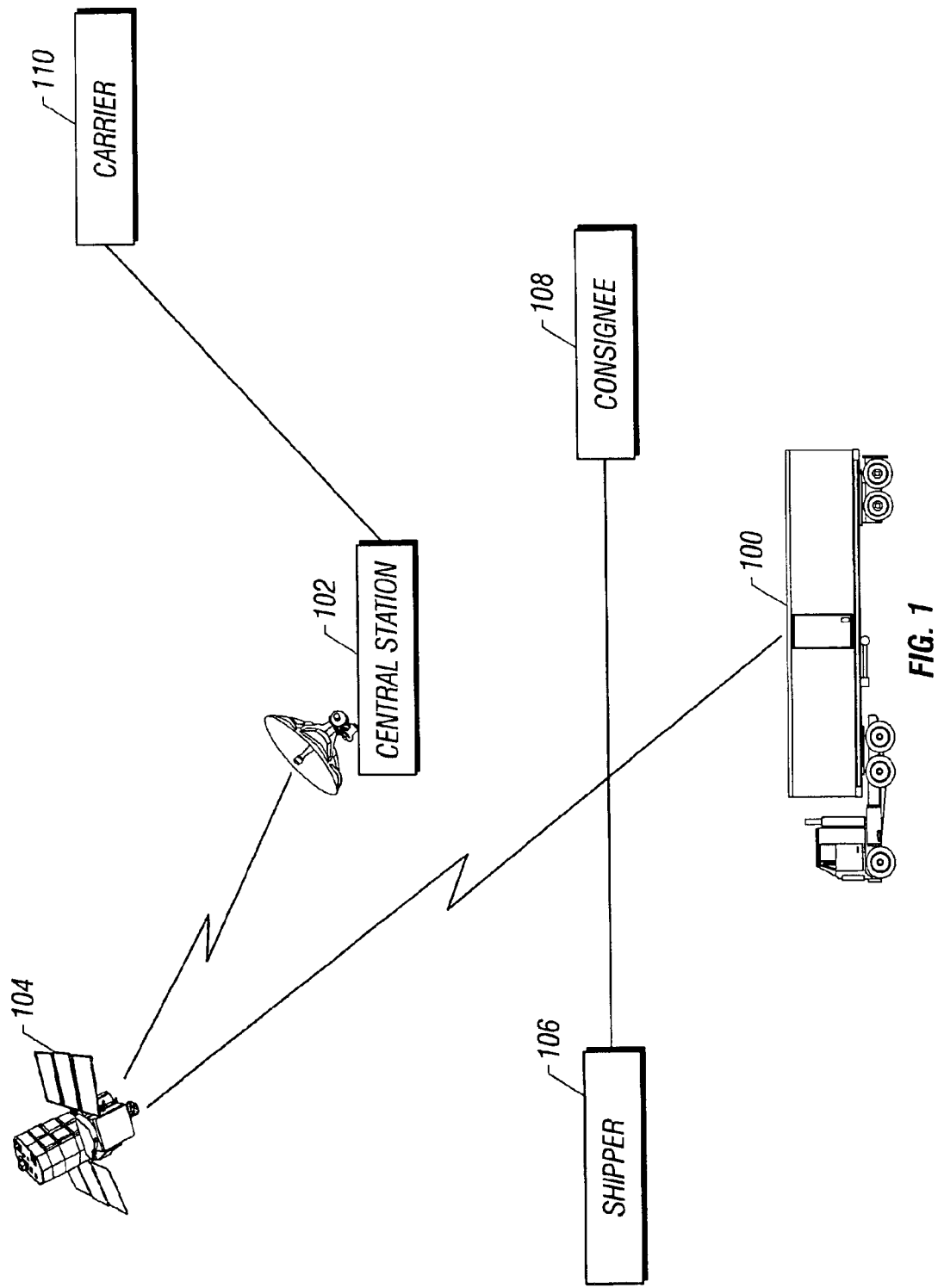
FIG. 1 illustrates the various elements involved in providing a proof of delivery verification in a land vehicle application using a mobile communication device.

FIG. 1 illustrates the various elements involved in providing a proof of delivery verification in a land vehicle application using a mobile communication device. Vehicle 100, in this embodiment, comprises a tractor-trailer, commonly used in the long-haul trucking industry. In other embodiments, vehicle 100 could alternatively comprise other types of land vehicles, such as a pick-up truck, a courier vehicle commonly used by such delivery companies such as Federal Express of Memphis, Tenn. and United Parcel Service of Atlanta, Ga. Vehicle 100 could also alternatively comprise a water-based vessel, such as a boat or a ship, or even an aircraft.

Vehicle 100 comprises a mobile communication terminal (MCT, not shown) for communicating with a remote station 102. The MCT resides onboard a tractor portion of vehicle 100, in one embodiment. Remote station 102 comprises a central processing center, otherwise known as a "hub" and serves as a central communication point between all vehicles having an MCT and their respective dispatch centers, or other designated office(s). In another embodiment, remote station 102 comprises a dispatch center relating to a single entity, such as a carrier dispatch center, whereby communications would be directed from vehicle 100 directly to each dispatch center corresponding to each vehicle. In another embodiment, remote station 102 comprises a transceiver and a processing unit located a distance away from vehicle 100, including being located at other vehicles, truckstops, consignees, or other predetermined locations.

The MCT transmits and receives communications wirelessly using, in one embodiment, a satellite 104. In other embodiments, the MCT uses a terrestrial wireless communication system to communicate with remote station 102, such as an analog or a digital cellular telephone system, or a wireless data communication network, such as a cellular digital packet data (CDPD) network. Regardless of the method of wireless communications used, either a shipper 106 or a consignee 108 initiates contact with carrier 110 for the purpose of picking up goods from one location and delivering the goods to a destination. Consignee 108 comprises any entity, such as a business or an individual, capable of receiving goods. Shipper 106 comprises an individual or a business, having goods to ship. Carrier 110 comprises an individual or a business for providing transportation services to pick up goods from shipper 106 to consignee 108. Carrier 110 comprises a trucking company in one embodiment, typically comprising a number of vehicles 100 for the purpose of delivering goods between various shippers 106 and consignees 108.

Carrier 110 may be contacted by a shipper 106, by a consignee 108, or by an authorized third party, such as a third party logistics provider 114, to arrange for the delivery of goods from shipper 106 to consignee 108. Third party logistics provider 114 is well known in the transportation industry for providing logistic services, such as scheduling and billing, to carriers, shippers, and consignees. From this communication, the details of the shipment are provided to carrier 110, such as the location of the shipper, the date and time of the pick-up, the location of the destination, the desired date and time of delivery, and the amount and type of goods to be transported. Typically, a document evidencing the shipment details is generated by carrier 110, known as a "bill of lading" in the trucking industry. Other industries may use the same or similar methods of documenting details of the shipment.

Also at this time, an electronic record of the expected delivery may be created by carrier 110 and stored in a database. In another embodiment, the record is created by remote station 102. The database may be located at carrier 110, third party logistics provider 114, or at remote station 102. The record comprises information relating to the expected delivery, such as a vehicle identification code corresponding to a vehicle assigned to handle the delivery, a description and quantity of the goods being shipped, a purchase order number, a bill of lading number, an expected delivery time and date, a destination location, a name of a consignee, and a shipping code. The shipping code may be used to uniquely identify the delivery and is used to validate an actual delivery of goods to the consignee.

After carrier 110 has been given the necessary details of a shipment, one or more vehicles in carrier 110's fleet of vehicles is dispatched to shipper 106 to pick up the shipment. This may be accomplished by wirelessly transmitting a message to vehicle 100 or by physically providing the bill of lading to a vehicle operator at carrier 110 or a branch office of carrier 110. Once the vehicle operator has been given the bill of lading, he or she directs vehicle 100 to shipper 106.

When vehicle 100 arrives at shipper 106, the goods are loaded into vehicle 100 for transport to consignee 108. The goods may be secured inside vehicle 100 by means of an electronic locking device (not shown), discussed later herein. The locking device may be activated manually by the vehicle operator, or it may be activated based on a status or a location of vehicle 100, or a combination of things. For example, the vehicle operator may transmit a message to remote station 102 using the MCT indicating that the goods are loaded and that vehicle 100 is proceeding to consignee 108. In response to the message, the electronic locking device activates until a second message is transmitted by the vehicle operator indicating that he or she has arrived at consignee 108. The location of vehicle 100 may be used alternatively, or in conjunction with, the messages transmitted by the vehicle operator. For example, the electronic locking device may be activated/deactivated based on the location of the vehicle (i.e., at shipper 106, in route, or at consignee 108). The operation of the electronic locking device is discussed later herein.

Vehicle 100 travels along route 112 to arrive at consignee 108. Route 112 is typically many miles long and may or may not place vehicle 100 in close proximity to carrier 110. Generally, the electronic locking device remains in a locked position, preventing access to the goods.

When vehicle 100 arrives at consignee 108, the electronic locking device is deactivated, allowing the vehicle operator and/or consignee access to the goods inside vehicle 100. The locking device may be deactivated manually be the vehicle operator, or by a status and/or location of vehicle 100. In one embodiment, an agent of consignee 108 confirms delivery by providing a shipment code to the vehicle operator, which in turn deactivates the locking device. In another embodiment, the agent contacts an authorized party directly to validate the arrival of vehicle 100, by telephone, email, web-browser, facsimile, or other means. In another embodiment, the shipment code is used in conjunction with the location of vehicle 100 as provided by a position determination system to confirm that vehicle 100 has indeed arrived at consignee 108.

In any event, the electronic locking device is deactivated, and the goods are unloaded from vehicle 100 to consignee 108. Typically, the agent of consignee 108 manually signs the bill of lading, proving receipt of the goods. In one embodiment, in addition to signing the bill of lading, the agent provides the shipment code to the vehicle operator, providing an indication that the goods were delivered. A validation request message may then be transmitted via the MCT to remote station 102, indicating delivery of the goods and requesting the delivery to be validated, thus generating a proof of delivery verification. Remote station 102, or an authorized third party, such as third party logistics provider 114, then validates the validation request and generates a proof of delivery verification which is sent to an interested party, such as shipper 106, consignee 108, a third party logistics provider, or carrier 110, using convention communication means, such as via telephone, a dedicated link, or the Internet. Carrier 110 can then immediately send an invoice to either shipper 106 or consignee 108, along with an indication of the proof of delivery verification, if necessary. The proof of delivery verification may contain pertinent information of the delivery, such as the date and time of delivery, as well as an identification of vehicle 100, a bill of lading number, or other information. The ability to provide a proof of delivery verification to interested parties enables carrier 110 to be paid more quickly as opposed to waiting for the vehicle operator to deliver the actual signed bill of lading to carrier 110.

Figure 2:
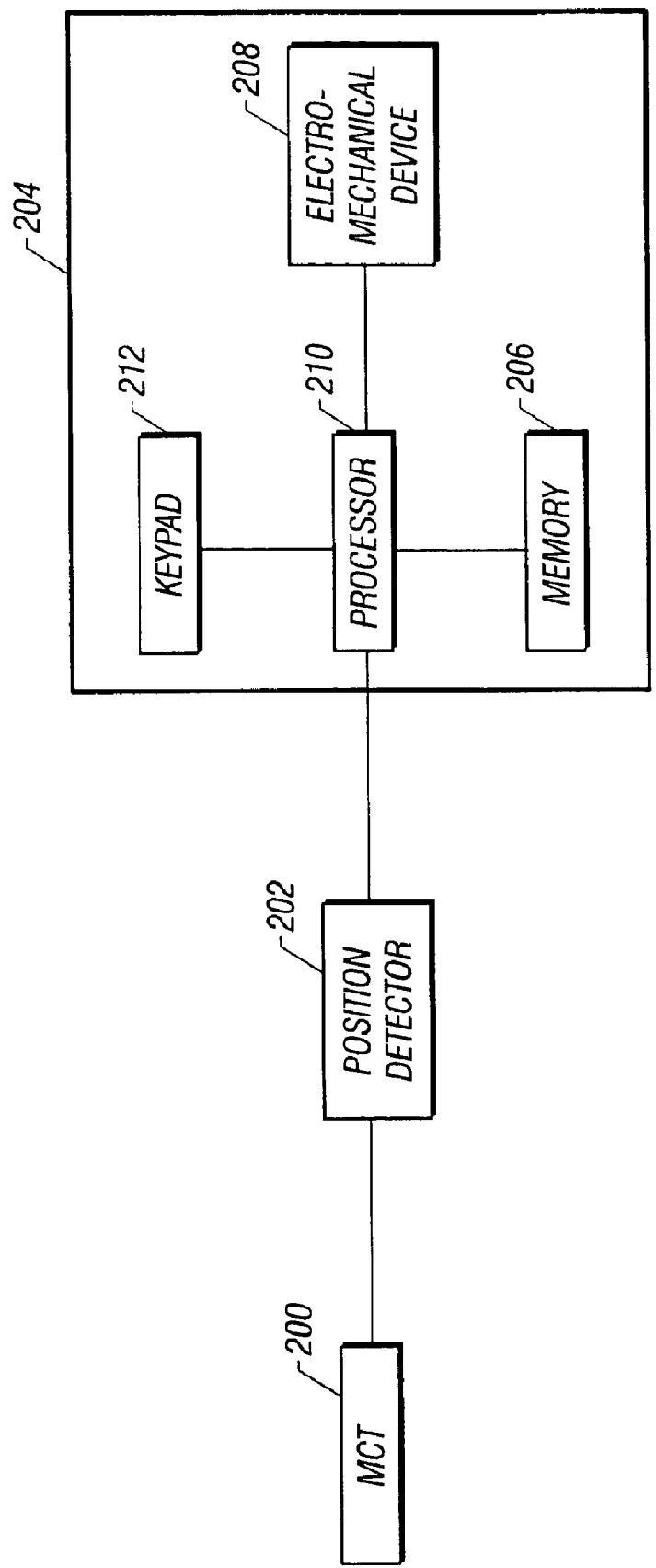
FIG. 2 illustrates the various components used in conjunction with the vehicle of FIG. 1 in one embodiment of the present invention.

FIG. 2 illustrates the various components used in conjunction with vehicle 100 in one embodiment of the present invention. Vehicle 100 comprises a wireless transceiver for communicating with remote station 102, known as a Mobile Communication Terminal (MCT) 200. MCT 200 may send and receive voice or text messages. In one embodiment, MCT 200 comprises an OnmiTRACS® satellite transceiver manufactured by Qualcomm Incorporated of San Diego, Calif., however, MCT 200 could alternatively comprise a digital or analog cellular transceiver. Typically, MCT 200 additionally comprises a keyboard and a display for allowing the vehicle operator to send and receive text messages. In other embodiments, MCT 200 is coupled to a variety of sensors throughout vehicle 100 to monitor the various vehicle functions, such as vehicle speed, rpm, driver status, and the like. In yet another embodiment, MCT 200 resides entirely onboard a trailer of vehicle 100.

The location of vehicle 100 may be determined by position detector 202. Although position detector 202 is shown as a separate element in FIG. 2, it should be understood that position detector 202 could alternatively be incorporated within MCT 200. In one embodiment, position detector 202 comprises a Global Position Satellite (GPS) receiver capable of determining the location of vehicle 100 within several meters or less. The use of GPS receivers to determine vehicle position is well known in the art. Other means for determining the position of vehicle 100 could be used in the alternative, such as by using a LORAN-C position location system, or a dead reckoning system. In another embodiment, the position of vehicle 100 is not determined by position detector 202 but rather by a system and method described in U.S. Pat. No. 5,017,926 entitled "DUAL SATELLITE NAVIGATION SYSTEM", assigned to the assignee of the present invention and incorporated by reference herein. In such a system, the position of vehicle 100 is determined by measuring a time delay between receipt of a signal from vehicle 100 through a pair of satellites. The position of vehicle 100 is thus calculated at remote station 102 and then, if necessary, provided to vehicle 100.

The location of vehicle 100 is generally provided to MCT 200 so that the vehicle position can be transmitted to remote station 102 when needed. It is also generally provided to allow a processor associated with MCT 200 to determine when to activate and de-activate electronic locking device 204. In another embodiment, the vehicle position is provided directly to electronic locking device 204 to determine when to operate electronic locking device 204.

Electronic locking device 204 provides security for goods which have been loaded onto vehicle 100. Typically, electronic locking device 204 comprises an electro-mechanical device 208 which allows a trailer door of vehicle 100 to be locked or unlocked. Electro-mechanical device 208 typcially comprises an electric motor which casues a mechanical element to move in response to an electrical signal.

The trailer door can be locked and unlocked by applying an appropriate electronic signal to electronic locking device 204, generally from MCT 200. However, in another embodiment, the electronic signal is generated directly by a processor 210 associated with electronic locking device 204. In this embodiment, electronic locking device 204 comprises a keypad 212 for entry of an alpha-numeric code to lock and unlock the trailer door. When the correct code is entered via the keypad, a mechanical locking mechanism associated with electronic locking device 204 is operated, thereby unlocking the trailer door. The code may be used in conjunction with a vehicle position as determined by position detector 202. For example, electronic locking device 204 may be de-activated by applying the correct code while vehicle 100 is at a predetermined location, such as at consignee 108. The keypad can also be used to lock the trailer door in a similar fashion.

The alpha-numeric code is typically generated by carrier 110, remote station 102, or third party logistics provider 114 and provided to the vehicle operator, however, in another embodiment, the alpha-numeric code is given to an agent of consignee 108 so that the trailer door can only be unlocked by the agent at consignee 108. In this embodiment, electronic locking device 204 is programmable to allow a unique alphanumeric code to be used with each delivery by vehicle 100. In this case, the alphanumeric code may be provided wirelessly to electronic locking device 204 via remote station 102. Remote station 102, or other authorized party, additionally provides the code to consignee 108 using conventional communication techniques, such as by telephone, email, or facsimile.

In another embodiment, the electronic signal for controlling electronic locking device 204 is generated using the position reported by position detector 202. Generally, a current position of vehicle 100 is compared to the pick-up location and/or destination location provided to determine when to operate electronic locking device 204. The pick-up location and destination is provided to MCT 200 and/or electronic locking device 204 in one of several possible ways. The pick-up and destination location can be transmitted to MCT 200 by remote station 102 and stored in an electronic memory of MCT 200 (not shown). Alternatively, after the pick-up and destination locations have been provided to MCT 200, they may be stored in a memory 206 associated with electronic locking device 204. In another embodiment, position reports based on position detector 202 may be transmitted to remote station 102, or other authorized party, such as third party logistics provider 114, where the present vehicle position is compared to the pick-up and destination locations. If remote station 102, or other authorized party, determines that vehicle 100 is within a predetermined distance from the pick-up or destination location, an indication of the arrival, such as an unlock message, is transmitted to MCT 200. This information may be used to activate or de-activate electronic locking device 204. Alternatively, the pick-up and destination information can be entered into MCT 200 directly by the vehicle operator via a keyboard, keypad, or other suitable device, and stored either within MCT 200 or in memory 206. Finally, this information may be entered via keypad 212 and stored in memory 206.

If the pick-up and destination information is stored directly within electronic locking device 204, the vehicle position is periodically provided either by MCT 200 or by position detector 202 to a processor (not shown) associated with electronic locking device. The processor then compares the vehicle position to the pick-up and destination information to determine if vehicle 100 is located at either one of these locations. If so, and in other embodiments, depending on other constraints as discussed below, the processor generates a signal which unlocks or unlocks the trailer door, as the case may be.

In embodiments where the pick-up and destination information is stored within MCT 200, periodic vehicle positions are provided by position detector 202 or by remote station 102 and compared with the pick-up and destination information by a processor associated with MCT 200. If vehicle 100 is within a predetermined distance from either the pick-up or destination locations, a control signal is generated by the processor associated with MCT 200 and provided to electronic locking device 204 which controls the locking mechanism and, hence, access to the goods onboard vehicle 100. In other embodiments, the control signal is generated as a result of calculations involving more than the vehicle position and pick-up/destination information, as described below.

In one embodiment, the control signal comprises two signals, a lock signal and an unlock signal. The lock signal is provided to electronic locking device 204 causing it to lock a vehicle door, for example. The unlock signal causes electronic locking device 204 to unlock the door. In another embodiment, the control signal comprises a single signal which causes a state change in electronic locking device 204. For example, the first time the control signal is applied to electronic locking device 204, the vehicle door is locked. The next time the control signal is applied to electronic locking device 204, the vehicle door is unlocked.

In one embodiment using two control signals (i.e., an unlock signal and a lock signal), an unlock signal may be provided to electronic locking device 204 when it is determined that vehicle 100 has arrived at a pick-up or destination location. In another embodiment, the unlock signal is provided only when the arrival of vehicle 100 is validated by remote station 102, or other authorized party. The unlock signal may be generated by MCT 200 or directly by electronic locking device 204, and instructs electronic locking device 204 to unlock the trailer door. A lock signal is provided to electronic locking device 204 when it is determined that vehicle 100 is not at either a pick-up or destination location.

The determination of whether or not vehicle 100 is at a pick-up or destination location may be accomplished in a number of ways. In one embodiment, the determination is made by simply comparing the present vehicle position to either the pick-up or destination information, as explained above. That is, if vehicle 100 is within a predetermined distance from either location, vehicle 100 is determined to be at either the pick-up, or destination, location. Accordingly, an unlock signal is provided to electronic locking device 204, and the trailer door is unlocked. If vehicle 100 is not within the predetermined distance from either location, vehicle 100 is determined not to be at either a pick-up or destination location, and a lock signal is provided to electronic locking device 204.

In another embodiment, an agent of consignee 108 determines arrival of vehicle 100 simply by physically inspecting the vehicle for the proper shipment in accordance, generally, with a bill of lading or other document. If the shipment is proper, the agent contacts an authorized party, such as third party logistics provider 114 or remote station 102, to request validation of the delivery. The agent may then provide pertinent details concerning the delivery to the authorized party.

In another embodiment, vehicle 100 is declared to be at a pick-up or destination location when vehicle 100 is within a predetermined distance from the pick-up or destination location and vehicle 100 has been at that location for more than a predetermined time period. Otherwise, vehicle 100 is determined not to be at a pick-up or destination location, and electronic locking device 204 remains locked.

In another embodiment, arrival is determined using the position of vehicle 100 compared to the pick-up and destination information, as well as the speed of vehicle 100. For example, if the speed of vehicle 100 is less than a predetermined speed for more the a predetermined amount of time, and vehicle 100 is within a predetermined distance of either the pick-up or destination location, vehicle 100 is determined to be at a pick-up or arrival location.

In other embodiments, the location of vehicle 100 may be determined by using local radio frequency (RF) or infrared (IR) detectors located at consignee 108 and other predefined destinations. Such an embodiment comprises vehicle 100, or alternatively the goods being carried by vehicle 100, having an RF or IR identification tag. Such a tag is detected by a sensing device located at predetermined locations, such as at a consignee. A vehicle identification, or an identification of goods, shipper, or destined consignee may be provided by the tag. When the tag is detected, the information is used to declare an arrival of vehicle 100, and an indication of the arrival is provided to remote station 102, or other authorized party, using techniques well known in the art, such as by providing the arrival indication via telephone, email, facsimile, radio transmissions, etc. In a related embodiment, a wireless local area network (LAN) or wide area network (WAN) is used to detect arrival of vehicle 100 at consignee 108 or other location.

The locking signal may be provided to electronic locking device 204 when it is determined that vehicle 100 contains goods, as determined by a cargo sensor onboard vehicle 100 (not shown) and that vehicle 100 is "in transit". The "in transit" status can be declared when vehicle 100 is a predetermined distance from a pick-up or destination location, or when the speed of vehicle 100 is greater than a predetermined speed, or a combination of both. Alternatively, the vehicle operator can transmit a message using MCT 200 indicating that the vehicle is leaving the pick-up location on the way to the destination.

The lock and unlock signals may be generated in ways which do not involve the use of position sensor 202. For example, these signals may be generated directly by electronic locking device 204 in conjunction with a keypad, or other input device. In this embodiment, a shipment code is provided to either the vehicle operator or an agent of consignee 108. When the vehicle arrives at a pick-up or destination location, the operator or agent enters the shipment code using the keypad, thereby generating an unlock signal which unlocks the vehicle door. The shipment code may be used in conjunction with the location of the vehicle. For example, the lock signal is generated only if vehicle 100 is at consignee 108 and the correct shipment code is entered. Of course, the methods just described to unlock the vehicle door may also be used to lock it.

A lock signal may be generated any time vehicle 100 is traveling more then a predetermined speed, as determined by a speed sensor, a tachometer, or a GPS-based determination that the vehicle is in transit. In other embodiments, the time taken to travel a predetermined distance could also be used to determine the speed of vehicle 100.

In another embodiment, an unlock signal is generated by MCT 200 when the vehicle operator transmits a message to remote station 102 indicating arrival at a pickup or destination location. Similarly, a lock signal is generated by MCT 200 when the vehicle operator transmits a message to remote station 102 indicating departure from a pick-up or a destination location. In these cases, the type of control signal (i.e., lock or unlock) is generated by knowing the type of message (i.e., arriving, departing) transmitted by MCT 200.

As shown above, there are a number of factors that can be used to determine when to lock and unlock electronic locking device 204, including vehicle position, vehicle speed, vehicle RPM, time, existence of goods within the vehicle, and human interaction. It should be understood that the lock signal and the unlock signal may be generated using a combination of the above-discussed methods, or other methods and factors not specifically disclosed herein. It should be further understood that the determination of when to lock and unlock electronic locking device 204 can be made by remote station 102, third party logistics provider 114, or other authorized party.

A proof of delivery verification can be quickly provided to shipper 106 or other interested party once arrival of vehicle 100 at consignee 108 is validated by remote station 102, or other authorized party, as described below. The proof of delivery verification can be used in conjunction with electronic locking device 204 in alternate embodiments. Validation is generally accomplished by comparing information transmitted to remote station 102 to an expected delivery record contained in a database. If the information contained in the expected delivery record matches information contained or deduced from the validation request message, the arrival of vehicle 100 is validated, thereby validating that the goods were delivered.

In one embodiment, a shipment code is generated either by remote station 102, or other authorized party, such as by third party logistics provider 114 or by carrier 110, and then provided to consignee 108. The shipment code may be unique to the particular consignee, allowing it to be used for multiple deliveries. Or it may be load specific, i.e., it may only be used in conjunction with a specific shipment. The shipment code may comprise a single alpha-numeric code or it may comprise two or more related alpha-numeric codes, for example, a username and a password. In one embodiment, a username comprises the name of a consignee and the password comprises an identification code identifying a particular shipment of goods, for example, a bill of lading number, a purchase order number, or other unique identifier.

When vehicle 100 arrives at consignee 108, the vehicle operator typically reports to an agent of consignee 108 to notify the agent that vehicle 100 has arrived with a load of goods as specified in a bill of lading or other similar document. Upon inspection of vehicle 100, the agent can determine whether to accept delivery of the goods, based on a number of factors, such as the quality of the goods, or simply whether the goods are in conformance with the bill of lading.

If the agent accepts the goods, they are typically unloaded from vehicle 100 and the delivery is completed. The agent will typically sign the bill of lading, evidencing acceptance and delivery of the goods. In addition, the agent will provide the consignee's shipment code to the vehicle operator. The vehicle operator enters the shipment code into MCT 200 and transmits a validation request message to remote station 102 indicating delivery of goods identified by the bill of lading or other identifying information and also to request that arrival of vehicle 100 be validated so that a proof of delivery verification can be generated. In one embodiment, the validation request message comprises the shipment code and information to identify the shipment, such as a vehicle identification number, a purchase order number, or a bill of lading number. The identity of the shipment may also be deduced by examining the shipment code, the date, time, and/or location of vehicle 100. In one embodiment, the message, or just the shipment code, is encrypted by MCT 200 using one of several known techniques. The message, or just the shipment code, may further be "digitally signed" using techniques known in the art to provide authentication of the message or shipment code. In an alternative embodiment, the agent enters the shipment code into MCT 200 himself so that the vehicle operator does not have access to the code.

When the validation request message is received by remote station 102, it is either processed at remote station 102 or it is forwarded to an authorized party, such as third party logistics provider 114, for processing. In either case, a processor associated with remote station 102 or authorized third party examines it to determine whether the arrival of vehicle 100 corresponds to an expected delivery, as provided by a database. In one embodiment, arrival of vehicle 100 is validated simply if the shipment code is found in the database. In this embodiment, the shipment code corresponds to a particular shipment. If the shipment code is found in the database, it indicates that the shipment is outstanding. When a shipping code is found, validation is successful and the record is removed from the database.

In other embodiments, validation is performed by examining other information contained in the validation request message or information deduced by receipt of the verification request message itself. For example, the vehicle position, vehicle identification, and/or time and date of arrival at consignee 108 can be used to validate the arrival of vehicle 100. In these embodiments, the database is accessed to retrieve an expected shipment record corresponding to this information. The record is compared to the information to determine if the arrival of vehicle 100 corresponds to an expected delivery. If an expected shipment record matches the verification request message, the arrival of vehicle 100 is validated, and a proof of delivery verification is generated by the processor and sent to a carrier identified by the verification request, or the identity of the carrier may be provided by the record. The proof of delivery verification may comprise only the shipment code, the shipment code plus information identifying the shipment, or simply an indication that a particular shipment was validated. If the shipment code was encrypted at MCT 200, it may be left encrypted for delivery to interested parties if such interested parties are able to be identified by remote station 102. Remote station 102, or other authorized party, may also decrypt the shipment code and re-encrypt it for transmission to interested parties. In one embodiment, if the shipment code was not encrypted by MCT 200, remote station 102 encrypts the shipment code prior to delivery to interested or authorized parties.

In one embodiment, a vehicle identification code and a date and time of arrival is used to verify the arrival of vehicle 100. In this embodiment, the database is accessed to find a record corresponding to the vehicle identification code. The vehicle identification code comprises a vehicle identification number (VIN), an MCT identification code, a vehicle license plate number, or other unique identification code assigned to vehicle 100. If vehicle 100 comprises a multi-part vehicle, such as a tractor-trailer truck or a locomotive connected to multiple freight cars, the vehicle identification may comprise an identification code corresponding to one or more portions of the multi-part vehicle. For example, a tractor may have a unique identification code assigned to it and its associated trailer may also have a unique identification code assigned. In this case, either identification code could be used to identify vehicle 100, or both identification codes could be used.

If a record is found matching the vehicle identification code, and the date of arrival matches an expected date of arrival in the record and the time of arrival is within a predetermined time period of an expected time of arrival in the record, arrival of vehicle 100 is validated.

In another embodiment, the vehicle location and a date and time of arrival is used to verify the arrival of vehicle 100. In this embodiment, the vehicle location is used to search the database to find a record having an expected destination within a predetermined distance from the vehicle location. If such a record is found, and the date of arrival matches an expected date of arrival in the record and the time of arrival is within a predetermined time period of an expected time of arrival in the record, arrival of vehicle 100 is validated.

In yet another embodiment, the vehicle location and a vehicle identification code is used to verify the arrival of vehicle 100. In this embodiment, the vehicle location or the vehicle identification code is used to find a record having an expected destination within a predetermined distance from the vehicle location or a record matching the vehicle identification code. If such a record is found, the arrival of vehicle 100 is validated. This embodiment may be enhanced by also comparing the date of arrival to an expected date of arrival in the record and a time of arrival to an expected time of arrival as shown in the record. In this case, arrival of vehicle 100 is validated if the date of arrival matches the expected date of arrival in the record and the time of arrival is within a predetermined time period of the expected time of arrival in the record.

The proof of delivery verification may be provided by telephone, facsimile, email, or other means. It may be provided automatically or by human intervention. The shipment code contained within the proof of delivery provides proof to the carrier that the identified delivery was completed. In another embodiment, simply receiving a proof of delivery verification, along with information identifying the shipment, is sufficient.

In another embodiment, the proof of delivery verification generated at remote station 102, or authorized third party, is provided directly to interested parties. In this embodiment, the validation request message received from MCT 200 is examined and compared to a record in the database to determine the identity where to send the verification, either by examining the shipment code, or by other information contained within the message or database.

In another embodiment of the present invention, electronic locking device 204 is used in conjunction with the proof of delivery verification to authorize access to the goods stored in vehicle 100. In this embodiment, vehicle 100 arrives at consignee 108 with a load of goods generally identified by a bill of lading. Vehicle 100 comprises electronic locking device 204 which prevents access to the goods by locking a trailer door of vehicle 100.

The vehicle operator notifies an agent of consignee 108 that the vehicle has arrived. The agent then provides a shipment code, as explained above, to the vehicle operator. The vehicle operator then transmits a validation request message to remote station 102 indicating arrival at consignee 108 and requesting validation of the arrival. The validation request typically comprises the shipment code. The validation request message implicitly comprises a request to de-activate electronic locking device 204, thereby unlocking the vehicle door. In another embodiment, the agent provides the shipment code and other information pertinent to the shipment directly to remote station 102 or to an authorized party by telephone, facsimile, email, etc. This information may be forwarded by various interested parties to an authorized party to determine validation.

If the validation request message is successfully validated, the authorized party generates and provides a proof of delivery verification to interested parties, such as shipper 106 and/or carrier 110. Carrier 110 may then immediately get paid for the delivery. In addition, an unlock signal may be transmitted from remote station 102 to MCT 200, instructing a processor associated with MCT 200 to unlock electronic locking device 204.

Figure 3:
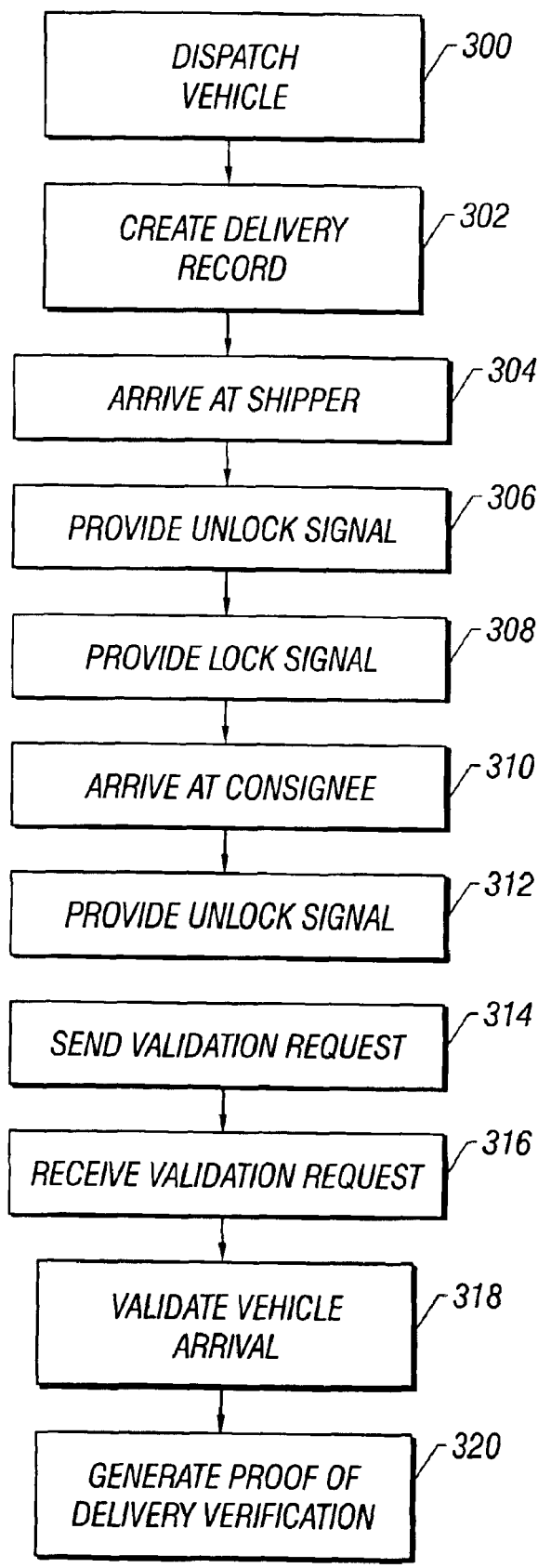
FIG. 3 is a flow diagram illustrating one method for providing a proof of delivery verification.

FIG. 3 is a flow diagram illustrating a method for providing a proof of delivery verification. In step 300 vehicle 100 is dispatched to shipper 106 to pick up a load of goods to be delivered to consignee 108. Generally, the vehicle operator is notified of the specifics of the delivery, such as the type and quantity of goods, and the expected day and time of arrival at consignee 108. In step 302, a record of the expected delivery is created and stored in a database.

In step 304, the vehicle arrives at shipper 106. In step 306, if vehicle 100 comprises electronic locking device 204, an unlock signal is provided to electronic locking device 204 to gain access to a storage area within vehicle 100, such as a trailer. Electronic locking device 204 may be unlocked using one or more of the techniques discussed above. Goods are then loaded onto vehicle 100.

In step 308, if electronic locking device 204 is used, a lock signal is provided to electronic locking device 204 using one or more of the techniques discussed above. Access to the goods is then restricted. The trailer door remains locked throughout the journey to consignee 108.

In step 310, vehicle 100 arrives at consignee 108. An unlock signal is provided to electronic locking device 204, allowing access to the goods, as shown in step 312. The unlock signal may be generated using one or more of the techniques discussed above. However, in one embodiment, the unlock signal is not provided to electronic locking device 204 until the delivery is validated by remote station 102, or other authorized party. This process is shown as steps 314 through 320. The delivery is validated by sending a validation request message to remote station 102 via MCT 200 or by another method of communications, as shown in step 314. The validation request message generally comprises a shipment code and other information identifying the arrival of vehicle 100 at consignee 108.

In step 316, the validation request message is received by remote station 102 and either processed by remote station 102 or it is forwarded to an authorized party for validation. In step 318, a processor associated with remote station 102 or an authorized third party validates the arrival of vehicle 100 generally by authenticating the message and/or shipment code and checking the other information contained in the validation request message to determine if the delivery corresponds to an expected shipment. This is determined by the processor accessing a database, located at remote station 102, at the consignee identified in the validation request message, or at an authorized third party. In one embodiment, if the arrival of vehicle 100 is validated, an unlock message is transmitted to vehicle 100 via remote station 102 and MCT 200, thereby unlocking electronic locking device 204, permitting access to the goods onboard vehicle 100.

In step 320, a proof of delivery verification is generated by the processor associated with remote station 102 or authorized party and provided to interested parties, such as shipper 106 or consignee 108.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for providing a proof of delivery verification for a freight transportation system, comprising the steps of:
   receiving a shipment code from a consignee after arrival of a vehicle carrying goods destined for said consignee, the shipment code provided to consignee by a remote entity and used to accept delivery of the goods by the consignee;
   transmitting a validation request message upon the receipt of the shipment code, said validation request message comprising information relating to said arrival;
   receiving said validation request message by a remote station;
   validating said arrival if said information matches an expected shipment record as listed in a database;
   generating a proof of delivery verification if said arrival is validated; and
   providing said proof of delivery verification to an interested party.

2. The method of claim 1 further comprising the steps of:
   transmitting an unlock message from said remote station to said vehicle if said arrival is validated;
   receiving said unlock message by said vehicle;
   generating an unlock signal as a result of receiving said unlock message;
   providing said unlock signal to an electronic locking device onboard said vehicle, said electronic unlocking device for locking and unlocking a vehicle door; and
   de-activating said electronic locking device thereby unlocking said vehicle door.

3. The method of claim 1 wherein said validation request message comprises a shipment code, wherein the step of validating said arrival comprises the steps of:
   determining whether or not said shipment code is stored in said database; and
   validating said arrival if said shipment code is found in said database.

4. The method of claim 1 wherein said validation request message comprises a vehicle position and a vehicle identification code, wherein the step of validating said arrival comprises the steps of:
   retrieving a record from said database corresponding to said vehicle identification code;
   determining if said record indicates an expected delivery;
   validating said arrival if said record indicates an expected delivery within a predetermined distance of said vehicle position.

5. The method of claim 1 wherein said validation request message comprises a vehicle position and a vehicle identification code, wherein the step of validating said arrival comprises the steps of:
   determining a date and a time of said arrival;
   retrieving a record from said database corresponding to said vehicle identification code;
   determining if said record indicates an expected delivery;
   validating said arrival if said record indicates an expected delivery on said date of arrival within a predetermined time period from said time of arrival and said vehicle position is within said predetermined distance of an expected delivery location provided by said record.

6. An apparatus for providing a proof of delivery verification for a freight transportation system, comprising:
   a transmitter for transmitting a shipment code to a consignee, the shipment code used to accept delivery of goods by the consignee;
   a receiver for receiving a validation request message, said validation request transmitted by a wireless communication device after receipt of said shipment code from said consignee, said validation request message comprising information relating to an arrival of a vehicle at a destination;
   a database comprising expected delivery information;
   a processor for validating said arrival against said expected delivery information stored in said database;
   generating a proof of delivery verification if said arrival is validated; and
   means for providing said proof of delivery verification to an interested party.

7. The apparatus of claim 6 wherein said validation message comprises said shipment code, wherein said processor determines that said arrival is validated by retrieving a record from said database corresponding to said shipment code, said record indicating said expected delivery corresponding to said shipment code.

8. The apparatus of claim 6 wherein said message comprises a vehicle identification code, said apparatus further comprising:
   means for determining a date and time that said vehicle arrived at said destination;
   wherein said processor determines that said arrival is validated by retrieving a record from said database corresponding to said vehicle identification code, said record indicating an expected delivery due on a date equal to said date that said vehicle arrived at said destination and within a predetermined time period from said time that said vehicle arrived at said destination.

9. The apparatus of claim 8 wherein said vehicle identification code is selected from the group consisting of a vehicle license plate number, a vehicle identification number (VIN), a pre-assigned identification code, and a mobile communication terminal code.

10. The apparatus of claim 6 wherein said validation message comprises a vehicle location and a vehicle identification code, said apparatus further comprising:

means for determining a date and time that said vehicle arrived at said destination;

wherein said processor determines that said arrival is validated by retrieving a record from said database corresponding to said vehicle identification code, said record indicating an expected delivery due within a predetermined distance from said vehicle location on a date equal to said date that said vehicle arrived at said destination and within a predetermined time period from said time that said vehicle arrived at said destination.

11. The apparatus of claim 10 wherein said vehicle identification code is selected from the group consisting of a vehicle license plate number, a vehicle identification number (VIN), a pre-assigned identification code, and a mobile communication terminal code.

* * * * *